United States Patent [19]

DeLassus et al.

[11] Patent Number: 4,766,202

[45] Date of Patent: Aug. 23, 1988

[54] METHOD FOR THE PREPARATION OF A VINYLIDENE CHLORIDE INTERPOLYMER FILM

[75] Inventors: Phillip DeLassus; William J. Raich, both of Midland, Mich.

[73] Assignee: The Dow Chemical Company, Midland, Mich.

[21] Appl. No.: 44,163

[22] Filed: Jun. 17, 1987

Related U.S. Application Data

[62] Division of Ser. No. 655,794, Oct. 1, 1984, Pat. No. 4,694,068.

[51] Int. Cl.$^4$ ............................................. C08F 6/00
[52] U.S. Cl. ................................. 528/502; 264/331.15
[58] Field of Search ................. 526/343; 264/331.15; 528/502, 503

[56] References Cited

U.S. PATENT DOCUMENTS 4,694,068 9/1987 DeLassus ........................... 528/502

Primary Examiner—Christopher Henderson

[57] ABSTRACT

This invention is directed to a method of forming a vinylidene chloride interpolymer having enhanced barrier to atmospheric gas and water vapor. This enhanced barrier is achieved by fabricating the vinylidene chloride interpolymer into an article in a manner which allows between about 5 and about 50 percent crystallization to occur in the vinylidene chloride interpolymer while at a temperature above about 90° C. and before it is allowed to cool below about 90° C.

9 Claims, No Drawings

METHOD FOR THE PREPARATION OF A VINYLIDENE CHLORIDE INTERPOLYMER FILM

CROSS-REFERENCE TO RELATED APPLICATION

This is a divisional of application Ser. No. 655,794, filed Oct. 1, 1984, now U.S. Pat. No. 4,694,068.

BACKGROUND OF THE INVENTION

1. Field of the Invention

This invention relates to an improved process for preparing vinylidene chloride interpolymers. Specifically, it relates to the preparation of vinylidene chloride interpolymers having enhanced barrier to atmospheric gases and water vapor.

2. Description of the Prior Art

Vinylidene chloride interpolymers are well-known in the prior art. U.S. Pat. No. 3,642,743 teaches a method for preparing an interpolymer of vinylidene chloride and vinyl chloride. The polymerization is carried out in an aqueous suspension in a completely closed reaction vessel. Other methods of polymerization are well-known in the art.

Polymers and copolymers of vinylidene chloride with such well-known copolymers as acrylonitrile, vinyl chloride and lower alkyl acrylates are widely used as films for packaging foodstuffs and other articles. Such films possess many useful properties, such as inertness, ability to be heat sealed, transparency, shrinkability and low permeability to atmospheric gas and water vapor.

The present invention concerns a method of producing vinylidene chloride interpolymer articles possessing enhanced barrier to water vapor and atmospheric gases. The enhanced barrier is achieved by allowing a substantial degree of crystallization of the vinylidene chloride interpolymer article to occur after fabrication but before the article is substantially cooled.

It is known in the art that the use of nucleating agents will speed the crystallization of interpolymer films. Exemplary of such patents are U.S. Pat. Nos. 3,240,742; 3,793,265; 3,819,595.

It is desirable to produce a vinylidene chloride homopolymer or copolymer possessing enhanced barrier to atmospheric gases and water vapor without severely degrading the polymer's other physical properties. It is to this goal that the present invention is directed.

SUMMARY OF THE INVENTION

The present invention provides an interpolymer of vinylidene chloride and one or more monomers copolymerizable therewith. The interpolymer possesses enhanced barrier to atomspheric gases and water vapor without a significant degradation of the polymer's other physical properties. This enhanced barrier is obtained by fabricating the interpolymer into an article in a manner which allows between about 5 and about 50 percent crystallization to occur in the interpolymer while the temperature of the interpolymer is above about 90° C. and below the melting point of the interpolymer but before the interpolymer cools below about 90° C.

DETAILED DESCRIPTION OF THE INVENTION

The articles of the present invention are fabricated from a crystallizable interpolymer comprising vinylidene chloride in an amount of from about 75 to about 95 percent by weight of interpolymer and about 25 to about 5 percent by weight of interpolymer of one or more monomers copolymerizable therewith. The copolmerizable monomers suitable for use in the present invention are ethylenically unsaturated. Exemplary of suitable copolymerizable monomers are vinyl chloride, acrylonitrile, butyl acrylate, methyl acrylate, methyl methacrylate, vinyl acetate, methacrylonitrile, and methacrylic acid.

The polymerization of the interpolymers of the present invention are well-known in the art. Typically, the monomeric materials are introduced into an aqueous phase. The aqueous phase contains a water or monomer soluble polymerization initiator. Additionally, the aqueous phase contains a surface active agent capable of dispersing the monomeric materials. Examples of suitable surface active agents include the soluble salts of long chain alkyl sulfates or sulfonates or petroleum hydrocarbon sulfonates or the like. The polymerization is usually carried out with heating and agitation.

Also in accordance with known techniques, one or more conventional additives may be incorporated in the aqueous phase. Examples of such additives include plasticizers, pigments, thickeners, stabilizers and pH adjusters.

The enhanced barrier of the articles of the present invention is an improvement over prior articles. The improvement is achieved by fabricating the articles in a manner which allows between about 5 and about 50 percent crystallization to occur in the article while the temperature of the article is above about 90° C. and below the melting point of the interpolymer from which the article is fabricated but before the interpolymer cools below about 90° C. Any method of fabrication which allows the requisite amount of crystallization to occur while the article is at a temperature above aoout 90° C. and before it cools below about 90° C. is suitable for use in the present invention.

The vinylidene chloride interpolymers of the present invention crystallize slowly. Indeed, the interpolymers tend to supercool. That is, they cool below their melting point without forming crystalline structures. It has been found that allowing the interpolymer to cool below about 90° C., even if no crystallization occurs due to the interpolymers tendency to supercool, destroys the enhanced barrier of the interpolymer even if the temperature of the interpolymer is then raised above about 90° C. and the interpolymer allowed to crystallize at a temperature above about 90° C.

A method which relies on the natural, noninduced crystallization of the interpolymer is impractical due to the interpolymer's slow crystallization rate and tendency to supercool. Preferred methods according to the present invention avoid the problems caused by the interpolymer's slow crystallization rate and supercooling.

Crystallization of the interpolymers of the present invention can be induced. By inducing crystallization of the interpolymer, the length of time required to achieve the desired degree of crystallization is reduced. Correspondingly, the temperature of the interpolymer must be maintained above about 90° C. for a shorter period of time. The problem of supercooling is also avoided.

Crystallization is easily induced through the use of a nucleating agent. As used herein, the term "nucleating agent" refers to a substance capable of providing nuclei for crystal formation and growth.

The nucleating agents of the present invention can be crystallizable homopolymers of vinylidene chloride or crystallizable copolymers of vinylidene chloride and from about 25 to about 0 percent, based on total copolymer weight, of one or more monomers copolymerizable therewith. Suitable copolymerizable monomers are ethylenically unsaturated. Exemplary of suitable copolymerizable monomers are vinyl chloride, acrylonitrile, butyl acrylate, methyl acrylate, methyl methacrylate, vinyl acetate, methacrylonitrile, and methacrylic acid. The preferred copolymerizable monomer is vinyl chloride.

The nucleating agent must be present in the interpolymer immediately after fabrication of the interpolymer into an article. It is necessary that the nucleating agent not be completely heat plastified. The nucleating agent must substantially maintain its crystalline structure.

A number of distinct methods have been found for forming and incorporating the nucleating agents into the vinylidene chloride interpolymer.

One method suitable for use in the present invention utilizes crystallizable particles of the vinylidene chloride interpolymer from which the article is formed as a nucleating agent. The interpolymer is polymerized and recovered as described above. The article is fabricated in a manner such that not all of the interpolymer is heat plastified. The interpolymer which is not heat plastified acts as the nucleating agent.

Preferably, the interpolymer is fabricated at a temperature which is less than 5° C. above the melting point of the interpolymer and at or above a temperature sufficient to heat plastify enough interpolymer to fabricate into the desired article. Suitably, at least 95 percent of the interpolymer is heat plastified. Preferably at least 97 percent of the interpolymer is heat plastified. For the purpose of this application "heat plastified" means thermodynamic melting wherein the crystalline structure of the interpolymer is destroyed.

A second method suitable for use in the present invention employs a nucleating agent comprising a major portion of vinylidene chloride. The nucleating agent has a melting point at least 10° C. higher than the melting point of the vinylidene chloride interpolymer. To achieve the higher melting point the nucleating agent has a different composition than the vinylidene chloride interpolymer.

The nucleating agent is a crystallizable interpolymer which suitably comprises vinylidene chloride in an amount of from about 90 to 100 weight percent by weight of total nucleating agent. Preferably, the nucleating agent comprises vinylidene chloride is an amount of from about 95 to 100 weight percent by weight of total nucleating agent. The remainder of the nucleating agent comprises one or nore monomers copolymerizable with vinylidene chloride. Suitable compolymerizable monomers include vinyl chloride, acrylonitrile, butyl acrylate, methyl acrylate, methyl methacrylate, vinyl acetate, methacrylonitrile, and methacrylic acid. Preferably, the copolymerizable monomer is vinyl chloride.

The nucleating agent is polymerized from a starting monomer composition. The starting monomer composition comprises vinylidene chloride and, optionally, one or more of the above-recited copolymerizable monomers.

The nucleating agent and the vinylidene chloride interpolymer can be formed as part of the same polymerization process. The polymerization process, described above, for producing the vinylidene chloride interpolymer can be used to produce both the nucleting agent and the vinylidene chloride interpolymer.

The starting monomers are suspended, through the use of a dispersing agent, in an aqueous phase. The aqueous phase also contains a polymerization initiator. Polymerization of the starting monomers is initiated, and generally carried out in the presence of heat and agitation.

Polymerization is allowed to continue until achieving a conversion of starting monomer to polymer of between about 0.5 and about 2.5 percent. Preferably, from about 1 to about 2 percent. After achieving the desired degree of conversion an additional amount of one or more added monomers is added to the starting monomers to form a mixture. Polymerization of the mixture of starting monomers and added monomers continues until achieving a conversion of monomer to polymer of from about 50 to about 100 percent based on total weight of starting and added monomer. Polymerization is then terminated and the polymer recovered.

Suitable added monomers include vinyl chloride, acrylonitrile, butyl acrylate, methyl acrylate, methyl methacrylate, vinyl acetate, methacrylonitrile and methacrylic acid. Preferably, the added monomer is vinyl chloride. The composition of the added monomers varies as the composition of the starting monomers change. The polymer formed from the starting monomers and the added monomers must have a melting point at least 10° C. lower than the polymer formed from the starting monomers.

The polymer recovered after termination of the polymerization has two distinct compositional modes, said compositional modes having different melting points. This polymer is then fabricated into an article at a temperature between the melting points of the two compositional modes. In this way the compositional mode having the lower melting point is substantially heat plastified while the compositional mode with the higher melting point remains substantially not heat-plastified.

Another method suitable for use in the present invention employs a crystallizable nucleating agent formed in a polymerization process separate from that used to produce the vinylidene chloride interpolymer. The crystallizable nucleating agents are pre-polymerized polymer particles having a melting point at least 10° C. greater than the melting point of the vinylidene chloride interpolymer. The pre-polymerized polymer particles have a diameter between about 0.1 micron and 300 microns and comprise at least 95 percent vinylidene chloride by weight pre-polymerized polymer particles. Preferably, the pre-polymerized polymer particles have a diameter between about 0.1 and about 0.3 microns, e.g. from an emulsion polymerization, between about 100 and 300 microns, e.g. from a suspension polymerization, and comprise 97 to about 100 percent vinylidene chloride by weight pre-polymerized polymer particles.

That portion, if any, of the pre-polymerized polymer particle not comprising vinylidene chloride comprises one or more monomers copolymerizable with vinyliden chloride. Suitable comonomers are selected from the group consisting of vinyl chloride, acrylonitrile, butyl acrylate, methyl acrylate, methyl methacrylate, vinyl acetate, methacrylonitrile, and methacrylic acid. Preferably, the comonomer is vinyl chloride.

The comonomers are present in the pre-polymerized polymer particles in an amount of from about 5 to 0 weight percent, preferably, from about 3 to 0 weight percent, based on total pre-polymerized polymer particle weight.

The pre-polymerized polymer particles are suitably polymerized in a separate procedure similar to the procedure used to produce the vinylidene chloride interpolymer. Said procedure has been previously described.

According to the present method, the vinylidene chloride interpolymer and the pre-polymerized polmner particles are formed and recovered in separate procedures. The pre-polymerized polymer particles and the vinylidene chloride interpolymer are then intimately admixed. The pre-polymerized polymer particles are present in the admixture in an amount sufficient to induce crystallization in the vinylidene chloride interpolymer after fabrication thereof into a film. Suitably, the pre-polymerized polymer particles are present in an amount of from about 1 to about 10 percent by weight of total admixture. Preferably, from about 1 to about 3 percent by weight total admixture.

The admixture is then heat plastified and fabricated at a temperature above the melting point of the vinylidene chloride interpolymer but below a temperature at which the pre-polymerized polymer particles become substantially heat-plastified. Thus, the pre-polymerized polymer particles retain substantially all of their crystalline structure thus enabling them to nucleate the crystallization of the vinylidene chloride interpolymer.

The following examples are intended as illustrations only and are not intended to limit, in any manner, the invention as set forth in the claims.

The resins used in the following examples were all prepared by suspension polymerization techniques well known to those skilled in the art. Typically, the monomeric materials are introduced to an aqueous phase. The aqueous phase contains a monomer-soluble, polymerization initiator. Additionally, the aqueous phase contains a surface-active agent capable of dispersing the monomeric materials. The polymerization is generally carried out with heating and agitation.

EXAMPLE 1

A first thermoplastic resin was prepared by suspension polymerization utilizing monomeric materials comprising 85 weight percent vinylidene chloride and 15 weight percent vinyl chloride, both weight percents being based on total weight monomeric material. The resultant polymeric resin comprised approximately 12 weight percent vinyl chloride based on total weight polymeric resin. The resultant polymeric resin was admixed with 0.5 weight percent acetyl tributyl citrate and 3 weight percent epoxidized soybean oil as plasticizers.

A second thermoplastic resin was prepared by suspension polymerization utilizing monomeric materials comprising 100 weight percent vinylidene chloride, based on total weight monomeric material. The resultant polymeric resin had a melting point of 199° C., a molecular weight in excess of 100,000, and a particle size between about 100 and about 300 microns. This resin acted as the polyvinylidene chloride "seed".

The resultant polymeric resin was admixed with 3 weight percent epoxidized soybean oil as a plasticizer.

The first thermoplastic resin was dry-blended with the second thermoplastic resin. The resultaut resin blend was extruded into tapes at a temperature below 199° C. The tapes were molded into films at temperatures between about 170° C. and 190° C. The first thermoplastic resin had a nominal melting point of about 173° C.

The oxygen permeabilities of the films wre determined at 23° C. on an OX-TRAN 1050, commercially available from Modern Controls, Inc. The results are set forth in Table I.

TABLE I

| Run No. | Molding Temperature[1] | Weight Percent Polyvinylidene Chloride "Seed" Present[2] | Oxygen Permeability[3] |
|---|---|---|---|
| 1 | 170 | 0 | 0.203 |
| 2 | 175 | 0 | 0.227 |
| 3 | 180 | 0 | 0.299 |
| 4 | 185 | 0 | 0.297 |
| 5 | 190 | 0 | 0.290 |
| 6 | 170 | 1 | 0.128 |
| 7 | 175 | 1 | 0.115 |
| 8 | 180 | 1 | 0.117 |
| 9 | 185 | 1 | 0.116 |
| 10 | 190 | 1 | 0.110 |
| 11 | 170 | 5 | 0.193 |
| 12 | 175 | 5 | 0.130 |
| 13 | 180 | 5 | 0.095 |
| 14 | 185 | 5 | 0.090 |
| 15 | 190 | 5 | 0.075 |

[1] In degrees Centigrade.
[2] Based on total resin weight.
[3] (Cubic centimeter) (Film thickness in mils)/100 square inches per day per atmosphere. Determined at 23° C.

As the above table clearly demonstrates, the inclusion of the polyvinylidene chloride "seeds" significantly lowers the oxygen permeability of the resultant resin mixture.

EXAMPLE 2

A first thermoplastic resin was prepared by suspension polymerization utilizing monomeric materials comprising 85 weight percent vinylidene chloride and 15 weight percent vinyl chloride, both weight percents being based on total weight monomeric material. The resultant polymeric material comprised approximately 12 weight percent vinyl chloride based on total weight polymeric resin.

A second thermoplastic resin was prepared by suspension polymerization utilizing monomeric materials comprising 94 weight percent vinylidene chloride and 6 weight perent vinyl chloride, both weight percents being based on total weight monomeric material. The resultant polymeric resin comprised approximately 4 weight percent vinyl chloride based on total weight polymeric resin. This resin acted as the polyvinylidene chloride "seed".

The resultant polymeric resins were admixed with the addition of 3 weight percent epoxidized soybean oil as a plasticizer. The resultant admixture was molded into film between Mylar ® film at selected temperatures between 170° C. and 195° C.

The oxygen permeabilities of these films were measured at 50° C. on an OX-TRAN 1050, commercially available from Modern Controls Inc. The results are set forth in Table II.

TABLE II

| Run No. | Molding Temperature[1] | Weight Percent Vinylidene Chloride "Seed" Present[2] | Oxygen Permeability[3] |
|---|---|---|---|
| 1 | 170 | 0 | 1.65 |
| 2 | 175 | 0 | 3.41 |

TABLE II-continued

| Run No. | Molding Temperature[1] | Weight Percent Vinylidene Chloride "Seed" Present[2] | Oxygen Permeability[3] |
|---|---|---|---|
| 3 | 180 | 0 | 4.89 |
| 4 | 185 | 0 | 4.41 |
| 5 | 190 | 0 | 4.39 |
| 6 | 195 | 0 | 4.44 |
| 7 | 175 | 3 | 2.34 |
| 8 | 180 | 3 | 2.60 |
| 9 | 185 | 3 | 3.19 |
| 10 | 190 | 3 | 3.08 |
| 11 | 195 | 3 | 3.04 |

[1]In degrees Centigrade.
[2]Approximately 96 weight percent vinylidene chloride and 4 weight percent vinyl chloride, based on total resin weight.
[3](Cubic centimeters) (Film thickness in mils)/100 square inches per day per atmosphere. Numbers represent an average of 2 or 3 trials. Determined at 50° C.

As can be seen from the above table, the inclusion of vinylidene chloride "seed" comprising approximately 3 weight percent vinyl chloride significantly lowers the oxygen permeability of the resultant resin. This is true over the entire range of molding temperatures tested.

The resins used in the following examples were all prepared by suspension polymerization techniques well known to those skilled in the art. In order to produce the vinylidene chloride "seed" the suspension polymerization process was slightly modified. In the modified process, the monomeric materials which would comprise the vinylidene chloride seed were introduced into an aqueous phase. The aqueous phase contained a monomer-soluble polymerization initiator. Additionally, the aqueous phase contained a surface-active agent capable of dispersing the monomeric materials. Polymerization of these starting monomeric materials was initiated and allowed to continue until the desired amount of "seed" material was polymerized. At this point, additional monomers were added such that the composition of monomers in the aqueous phase would produce a vinylidene chloride interpolymer having a melting point at least 10° C. lower than the vinylidene chloride "seed" formed from the starting monomers. The polymerization is generally carried out with heating and agitation.

EXAMPLE 3

A thermoplastic resin was prepared by suspension polymerization utilizing monomeric materials comprising 100 weight percent vinylidene chloride. Polymerization of the vinylidene chloride was initiated and allowed to continue for approximately two hours, thus obtaining an estimated conversion of monomer to polymer of approximately 1 percent. At this point, an amount of vinyl chloride was added to the partially polymerized vinylidene chloride such that the monomers present in the aqueous phase comprised approximately 80 weight percent vinylidene chloride and 20 weight percent vinyl chloride, both weight percents being based on total weight monomeric material present in the aqueous phase. Polymerization of the monomers present in the aqueous phase continued until achieving approximately 93 percent conversion of monomer to polymer.

The resultant polymeric resin was admixed with 0.4 weight percent acetyl tributyl citrate and 1 weight percent epoxidized soybean oil as plasticizers.

Extruded films were then prepared from the plasticized resin. A layer of the plasticized resin approximately 5 mils thick was extruded between two layers of polypropylene. The polypropylene layers were about 15 mils thick. Samples of film approximately 7 inches wide and 18 inches long were captured on a flat surface as they exited the extruder. The film samples were immediately placed in ovens having an internal temperature of about 50° C., 70° C., 80° C., 95° C., 110° C. and 125° C.

The film samples were allowed to remain in the oven having an internal temperature of 50° C., 70° C., 95° C., and 110° C. for approximately 18 hours. The samples in the oven having an internal temperature of 125° C. were removed therefrom after approximately one hour. The sample at 25° C. was quenched in room temperature water and allowed to crystallize at 25° C. The oxygen permeabilities of the resultant film were then determined on an OX-TRAN 1050.

For comparison, films were prepared and tested as outlined above with the sole variation being the omission of the initial two hour polymerization of 100 weigt percent vinylidene chloride. Instead, the vinylidene chloride and vinyl chloride (80:20, respectively) comprised the starting monomers and were polymerized and mixed with plasticizer, as detailed above, to form the polymeric resin.

The results of the example are set forth in Table III.

TABLE III

| Run No. | Oven Temperature[1] | Method of Preparation[2] | Oxygen Permeability[3] |
|---|---|---|---|
| 1 | 25 | seeded | 2.27 |
| 2 | 50 | seeded | 1.59 |
| 3 | 73 | seeded | 1.40 |
| 4 | 80 | seeded | 1.32 |
| 5 | 95 | seeded | 1.18 |
| 6 | 110 | seeded | 1.27 |
| 7 | 125 | seeded | 1.18 |
| 8 | 25 | unseeded | 2.20 |
| 9 | 50 | unseeded | 1.8 |
| 10 | 70 | unseeded | 1.66 |
| 11 | 80 | unseeded | 2.0 |
| 12 | 95 | unseeded | 1.99 |
| 13 | 110 | unseeded | 1.70 |
| 14 | 125 | unseeded | 1.45 |

[1]In degrees Centigrade.
[2]"Seeded" refers to films prepared by a method wherein the 100 percent vinylidene chloride was allowed to polymerize for about 2 hours prior to addition of the vinyl chloride. "Unseeded" refers to films prepared by a method wherein the initial polymerization of 100 percent vinylidene chloride was omitted.
[3](Cubic centimeters) (film thickness in mils)/100 square inches per day per atmosphere. Numbers represent an average of two trials. Determined at 50° C.

As can be seen from Table III, the films prepared with the vinylidene chloride "seed" have a much lower oxygen permeability than do films prepared without the vinylidene chloride "seed". Additionally, films crystallized at a higher temperature are shown to have lower oxygen permeability than films crystallized at lower temperatures.

EXAMPLE 4

This example employed a film comprising approximately 89 weight percent vinylidene chloride and approximately 11 weight percent vinyl chloride. The film also contained approximately 4.1 parts per hundred weight resin of acetyl tributyl citrate, and approximately 0.9 parts per hundred weight resin epoxidized soybean oil. The film had a nominal melting point of about 173° C.

Three-gram samples of the above-described film were crumpled and molded in a steam assisted, electrically heated hydraulic press at temperatures between 170° C. and 195° C. The remolded films were cooled in the press and allowed to stand at room temperature for one or more days. The oxygen permeabilities of the remolded films were then determined with an OX-TRAN 1050. The results of this experiment are set forth in Table IV.

TABLE IV

| Run No. | Molding Temperature[1] | Oxygen Permeability[2] |
|---|---|---|
| 1 | 170 | 0.238 |
| 2 | 175 | 0.525 |
| 3 | 180 | 0.690 |
| 4 | 185 | 0.690 |
| 5 | 190 | 0.683 |
| 6 | 195 | 0.700 |

[1] In degrees Centigrade.
[2] (Cubic centimeters) (film thickness in mils)/100 square inches per day per atmosphere. Numbers represent an average of 1-3 trials. Determined at 22° C.

As can be seen from the above table, the oxygen permeability of the tested film increases as the molding temperature increases. At a molding temperature of 170° C. and 175° C., the starting films, having a nominal melting point of 173° C., would not be completely heat-plastified. The non-heat-plastified material acts as a nucleating agent. At molding temperatures of 180° C. and above, all of the film would be heat-plastified and no nucleating agent would be present.

EXAMPLE 5

This example employs the same film employed in Example 4. Three-gram samples of the film were crumpled and molded in a steam assisted, electrically heated hydraulic press at 175° C. The samples were removed from the press and quenched as quickly as possible in an ice/water slurry. The films were quickly removed from the slurry, before crystallization occurred, and placed in ovens having internal temperatures of 50° C., 75° C., 100° C., and 125° C., to crystallize. The crystallization at 50° C., 75° C. and 100° C. was allowed to continue for 20 hours. The crystallization at 125° C. was allowed to continue for 30 minutes. The oxygen permeabilities of those films were determined on an OX-TRAN 1050, at 23° C. The results are set forth in Table V.

TABLE V

| Run No. | Crystallization Temperature[1] | Oxygen Permeability[2] |
|---|---|---|
| 1 | 50 | 0.74 |
| 2 | 75 | 0.84 |
| 3 | 100 | 0.84 |
| 4 | 125 | 1.04 |

[1] In degrees Centigrade.
[2] (Cubic centimeters) (film thickness in mils)/100 square inches per day per atmosphere. Numbers represent an average of 1-2 trials. Determined at 23° C.

As can be seen from the above table, quenching the film to a temperature below about 90° C. prevents achieving enhanced barrier even if crystallization, after quenching, is allowed to occur at a temperature above about 90° C.

As is apparent from the foregoing specification, the present invention is susceptible of being embedied with various alterations and modifications which may differ particularly from those that have been described in the preceding specification and description. For this reason, it is to be understood that all of the foregoing is intended to be merely illustrative and is not to be construed or interpreted as being restrictive or otherwise limiting of the present invention, excepting as it is set forth and defined in the following claims.

What is claimed is:

1. An improved process for preparing a vinylidene chloride interpolymer article having enhanced barrier to atmospheric gases and water vapor, the process comprising four sequential steps, the steps being:
   (a) preparing a vinylidene chloride interpolymer having polymerized therein vinylidene chloride in an amount of from about 75 to about 95 percent by weight of interpolymer and from about 25 to about 5 percent by weight of interpolymer of at least one monomer copolymerized therewith, said interpolymer having a monomer copolymerized therewith, said interpolymer having a melting point, the interpolymer prepared by the following steps;
      (1) initiating polymerization of a starting monomer composition, the starting monomer composition comprising vinylidene chloride in an amount of from about 95 to 100 percent by weight of starting monomer composition and one or more monomers copolymerizable therewith in an amount of from about 0 to 5 percent by weight of starting monomers composition and continuing polymerization of the starting monomber composition until a conversion of monomer to polymer of from 0.5 to about 2.5 percent by weight of starting monomer composition, said polymer having a melting point;
      (2) continuing polymerization of the interpolymer by adding an additional amount of one or more monomers to the starting monomer composition to form a resultant monomer mixture and polymerizing the resultant monomer mixture to form a polymer which has a melting point at least about 10? C. lower than the polymer formed by polymerizing the starting monomer composition; and
      (3) completing preparation of the interpolymer by terminating polymerization after achieving a conversion of monomer to polymer of from about 50 to 100 percent based on total monomer mixture; and wherein step (c) and step (d) are performed at a temperature below the melting point of the polymer formed from the starting monomer composition.
   (b) recovering the vinylidene chloride interpolymer;
   (c) heat plastifying said vinylidene chloride interpolymer; and
   (d) fabricating said heat plastified interpolymer into an article; wherein the improvement comprises fabricating the vinylidene chloride interpolymer into an article in a manner which allows between about 5 and about 50 percent crystallization to occur in the vinylidene chloride interpolymer article while the artice is at a temperature above about 90° C. and below the melting point of the interpolymer but before the interpolymer cools below about 90° C.

2. The process of claim 1 wherein the starting monomer composition comrises 100 weight percent vinylidene chloride.

3. The process of claim 1 wherein the starting monomer composition comprises vinylidene chloride in an amount of from about 95 to about 100 percent by weight total starting monomer composition and vinyl chloride in an amount of from about 5 to about 0 percent by weight total starting monomer composition.

4. The process of claim 1 wherein the additional amount of one or more monomers added after partial polymerization of the starting monomer composition consists of vinyl chloride.

5. The process of claim 1 wherein the vinylidene chloride interpolymer recovered in step (b) is intimately mixed with an amount of pre-polymerized polymer particles prior to heat plastifying the vinylidene chloride interpolymer, the amount being sufficient to act as a nucleating agent for crystallization, the prepolymerized polymer particles having
  (1) a diameter between about 0.1 micron and 300 microns;
  (2) a melting point at least 10° C. greater than the melting point of the vinylidene chloride interpolymer; and
  (3) at least 95 percent vinylidene chloride by weight prepolymerized polymer particles; and wherein step (c) and step (d) are performed at a temperature below the melting point of the prepolymerized polymer particles.

6. The process of claim 5 wherein prepolymerized polymer particles comprise a homopolymer of vinylidene chloride.

7. The process of claim 5 wherein the prepolymerized polymer particles comprise a copolymer having polymerized therein vinyl chloride in an amount of from about 0 to about 5 percent by weight of total prepolymerized polymer particles and vinylide chloride in an amount of from about 95 to about 100 percent by weight of total prepolymerized polymer particles.

8. The process of claim 5 wherein the amount of prepolymerized polymer particles is from about 1 to about 10 percent by weight of total admixture.

9. The process of claim 5 wherein an intimate admixture is formed, prior to recovering the vinylidene chloride interpolymer by blending a first latex with a second latex, the first latex having dispersed therein in an amount of the prepolymerized polymer particles, the second latex having dispersed therein particles of the vinylidene chloride interpolymer.

* * * * *